United States Patent
Otaka

(10) Patent No.: US 11,930,415 B2
(45) Date of Patent: *Mar. 12, 2024

(54) RELAY APPARATUS, PROGRAM, COMMUNICATION SYSTEM, AND COMMUNICATION METHOD FOR HANDOVER CONNECTIONS

(71) Applicant: Honda Motor Co., Ltd., Tokyo (JP)

(72) Inventor: Masaru Otaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 455 days.

This patent is subject to a terminal disclaimer.

(21) Appl. No.: 17/176,405

(22) Filed: Feb. 16, 2021

(65) Prior Publication Data

US 2021/0168692 A1  Jun. 3, 2021

Related U.S. Application Data

(63) Continuation of application No. PCT/JP2019/014247, filed on Mar. 29, 2019.

(51) Int. Cl.
*H04W 36/00* (2009.01)
*H04B 17/318* (2015.01)
*H04W 4/40* (2018.01)
*H04W 16/26* (2009.01)
*H04W 24/10* (2009.01)
*H04W 36/08* (2009.01)
*H04W 36/32* (2009.01)
(Continued)

(52) U.S. Cl.
CPC .......... *H04W 36/32* (2013.01); *H04B 17/318* (2015.01); *H04W 24/10* (2013.01); *H04W 36/08* (2013.01); *H04W 88/04* (2013.01)

(58) Field of Classification Search
CPC ..... H04W 36/32; H04W 24/10; H04W 36/08; H04W 88/04; H04W 36/00835; H04W 84/005; H04W 4/40; H04W 16/26; H04B 17/318
USPC .......................................... 370/331
See application file for complete search history.

(56) References Cited

U.S. PATENT DOCUMENTS 8,660,087 B2 * 2/2014 Jeon ..................... H04W 12/062
455/436
8,730,918 B2 * 5/2014 Huang .................. H04W 36/12
455/437

(Continued)

FOREIGN PATENT DOCUMENTS

JP   2010103966 A   5/2010
JP   2011029988 A   2/2011
(Continued)

OTHER PUBLICATIONS

International Search Report of related international application PCT/JP2019/014247, dated May 28, 2019.

(Continued)

*Primary Examiner* — Amancio Gonzalez
(74) *Attorney, Agent, or Firm* — Suzanne Gagnon; American Honda Motor Co., Inc.

(57) ABSTRACT

A movable relay apparatus for relay communication, the relay apparatus transmits handover destination information to a communication terminal. The handover destination information indicates a handover destination, which allows the communication terminal to carry out a handover.

19 Claims, 7 Drawing Sheets

(51) Int. Cl.
*H04W 76/27* (2018.01)
*H04W 84/00* (2009.01)
*H04W 84/04* (2009.01)
*H04W 88/04* (2009.01)
*H04W 4/00* (2018.01)

(56) References Cited

U.S. PATENT DOCUMENTS

| | | | | |
|---|---|---|---|---|
| 9,042,346 | B2 * | 5/2015 | Kim | H04W 36/0009 370/315 |
| 9,066,242 | B2 * | 6/2015 | Kazmi | H04B 7/15507 |
| 9,237,501 | B2 * | 1/2016 | Kitaji | H04W 36/22 |
| 9,560,567 | B2 * | 1/2017 | Leng | H04B 7/2606 |
| 9,603,060 | B2 * | 3/2017 | Maeda | H04W 36/00835 |
| 9,763,146 | B2 * | 9/2017 | Tietz | H04W 36/0094 |
| 9,794,845 | B2 * | 10/2017 | Hwang | H04L 5/00 |
| 10,306,531 | B2 * | 5/2019 | Xu | H04W 36/03 |
| 10,455,477 | B2 * | 10/2019 | Shoshan | H04W 40/02 |
| 11,503,517 | B2 * | 11/2022 | Otaka | H04W 84/005 |
| 2007/0104148 | A1 * | 5/2007 | Kang | H04W 36/04 455/434 |
| 2011/0021221 | A1 | 1/2011 | Kondo | |
| 2013/0040558 | A1 * | 2/2013 | Kazmi | H04W 16/26 455/7 |
| 2013/0244569 | A1 | 9/2013 | Dunn et al. | |
| 2014/0098738 | A1 | 4/2014 | Matsumura et al. | |
| 2015/0024757 | A1 * | 1/2015 | Bulakci | H04W 36/0072 455/437 |
| 2016/0081055 | A1 | 3/2016 | Chika et al. | |
| 2017/0244468 | A1 | 8/2017 | Zhao | |
| 2018/0160338 | A1 * | 6/2018 | Huang | H04W 36/12 |
| 2021/0360496 | A1 * | 11/2021 | Ishii | H04W 36/0061 |
| 2022/0015176 | A1 * | 1/2022 | Ishii | H04W 76/19 |

FOREIGN PATENT DOCUMENTS

| | | |
|---|---|---|
| JP | 2012134887 A | 7/2012 |
| JP | 2012523805 A | 10/2012 |
| JP | 2012244609 A | 12/2012 |
| JP | 2015154357 A | 8/2015 |
| JP | 2017524321 A | 8/2017 |
| JP | 2018157249 A | 10/2018 |
| JP | 2019022094 A | 2/2019 |
| WO | 2009099215 A | 8/2009 |
| WO | 2018224128 A | 12/2018 |

OTHER PUBLICATIONS

English Translation of International Search Report of related international application PCT/JP2019/014247, dated May 28, 2019.
Written Opinion of the International Searching Authority of related international application PCT/JP2019/014247, dated May 28, 2019.
The First Office Action from The Patent Office of the People's Republic of China for Chinese Patent Application No. 201980093695.3, dated Apr. 20, 2023.
The Search Report from The Patent Office of the People's Republic of China for Chinese Patent Application No. 201980093695.3, dated Apr. 18, 2023.
Decision of Dismissal of Amendment from Japan Patent Office for Japanese Patent Application No. 2021-511716, dated Apr. 4, 2023.
Decision of Refusal from Japan Patent Office for Japanese Patent Application No. 2021-511716, dated Apr. 4, 2023.
Notice of Reasons for Refusal from Japan Patent Office for Japanese Patent Application No. 2021-511716, dated Nov. 18, 2022.
The Second Office Action from The Patent Office of the People's Republic of China for Chinese Patent Application No. 201980093695.3, dated Aug. 22, 2023.
The Second Search Report from The Patent Office of the People's Republic of China for Chinese Patent Application No. 201980093695.3, dated Aug. 22, 2023.
Notice of Reasons for Refusal from Japan Patent Office for Japanese Patent Application No. 2021-511716, dated May 10, 2022.

* cited by examiner

RELAY APPARATUS, PROGRAM, COMMUNICATION SYSTEM, AND COMMUNICATION METHOD FOR HANDOVER CONNECTIONS

CROSS-REFERENCE TO RELATED APPLICATION

This application is a continuation of International Patent Application No. PCT/JP2019/014247 filed on Mar. 29, 2019, the entire disclosure of which is incorporated herein by reference.

TECHNICAL FIELD

The present disclosure relates to a relay apparatus, a program, a communication system, and a communication method.

BACKGROUND

A movable relay apparatus which functions as a base station is known.

SUMMARY

A technology capable of appropriately supporting the operation of a relay apparatus is desired.

According to an aspect of the present disclosure a movable relay apparatus is provided for relay communication between a wireless base station and a communication terminal. The relay apparatus may include an information transmission part which transmits handover destination information (indicating a handover destination in which the communication terminal carries out handover without making a measurement report on the receiving radio waves) to the communication terminal (establishing a wireless communication connection with the relay apparatus).

The relay apparatus may include a movement determination part for determining whether or not the relay apparatus is moving, wherein the information transmission part may transmit the handover destination information to the communication terminal when the relay apparatus establishes a wireless communication connection with the communication terminal and it is determined that the relay apparatus has moved. The relay apparatus may include a movement speed determination part for determining whether or not the movement speed of the relay apparatus is faster than a predetermined speed, wherein the information transmission part may transmit the handover destination information to the communication terminal when the relay apparatus establishes a wireless communication connection with the communication terminal and it is determined that the movement speed of the relay apparatus is faster than the predetermined speed. The information transmission part may transmit, to the communication terminal, the handover destination information which indicates a wireless base station (with which the relay apparatus establishes the wireless communication connection) as the handover destination.

The relay apparatus may include a reception strength measurement part for measuring the radio wave reception strength from multiple movable relay apparatuses different from the relay apparatus, wherein the information transmission part may transmit, to the communication terminal, the handover destination information indicating a relay apparatus (having a stronger radio wave reception strength among the multiple movable relay apparatuses) as the handover destination. The relay apparatus may include a change determination part for determining temporal changes in the radio wave reception strength from multiple movable relay apparatuses different from the relay apparatus, wherein the information transmission part may transmit, to the communication terminal, the handover destination information indicating a relay apparatus (having a stronger radio wave reception strength and smaller temporal changes among the multiple movable relay apparatuses) as the handover destination. The relay apparatus may include a change determination part for determining temporal changes in the radio wave reception strength from multiple movable relay apparatuses different from the relay apparatus, wherein the information transmission part may transmit, to the communication terminal, the handover destination information indicating a relay apparatus (having smaller temporal changes among the multiple movable relay apparatuses) as the handover destination.

The relay apparatus may be installed in a vehicle. The information transmission part may transmit the handover destination information to the communication terminal in accordance with the state of the vehicle that is in a predetermined state. The vehicle may have an OFF state, a power ON state, and a drivable (or travelable) state, wherein the relay apparatus may execute a relay function for relaying communications between the wireless base station and the communication terminal when the vehicle is in the power ON state and the drivable state, and wherein the information transmission part may transmit the handover destination information to the communication terminal when the state of the vehicle switches from the power ON state to the drivable state.

According to an aspect of the present disclosure, a program is provided for allowing a computer to function as the relay apparatus.

According to an aspect of the disclosure, a communication system is provided. The communication system may include a movable relay part for relaying communications between a wireless base station and a communication terminal. The communication system may include an identification part for identifying a handover destination in which the communication terminal carries out handover without making a measurement report on the receiving radio waves. The communication system may include an information transmission part which notifies the communication terminal (establishing a wireless communication connection with the relay part) of handover destination information (indicating a handover destination identified by the identification part).

The communication system may include a state information acquisition part for acquiring state information of the relay part, wherein: the identification part may identify the handover destination when the relay part is in a first state, the information transmission part may notify the communication terminal of the handover destination information when the relay part is in a second state, the first state may be that in which the relay function of the relay part has been turned on, and the second state may be that in which the relay part is moving. The communication system may include a state information acquisition part for acquiring state information of the relay part, wherein: the identification part may update and identify the handover destination when the relay part is in a first state, the information transmission part may notify the communication terminal of the handover destination information when the relay part is in a second state, the first state may be that in which the current position of the relay part is a predetermined area, and the second state may be that in which the relay part moves beyond a predetermined speed.

According to an aspect of the disclosure, a communication method is provided. The communication method may include: identifying a handover destination in which the communication terminal (establishing movable wireless communication with a movable relay part for relaying communications between a wireless base station and a communication terminal) carries out handover from the relay part without making a measurement report on the receiving radio waves. The communication method may include: notifying the communication terminal (establishing a wireless communication connection with the relay part) of handover destination information (indicating a handover destination identified in the identification stage).

Note that the abovementioned summary of the present disclosure does not limit the present disclosure. Moreover, subcombinations of groups of these features may also be included in the present disclosure.

DETAILED DESCRIPTION

Although the present disclosure will hereinafter be described with reference to the accompanying drawings, the following embodiments are not intended to limit the disclosure according to the claims. Moreover, not all of the combinations of features described in the embodiments are essential to the disclosure. Moreover, subcombinations of groups of these features may also be included in the present disclosure.

Figure 1:
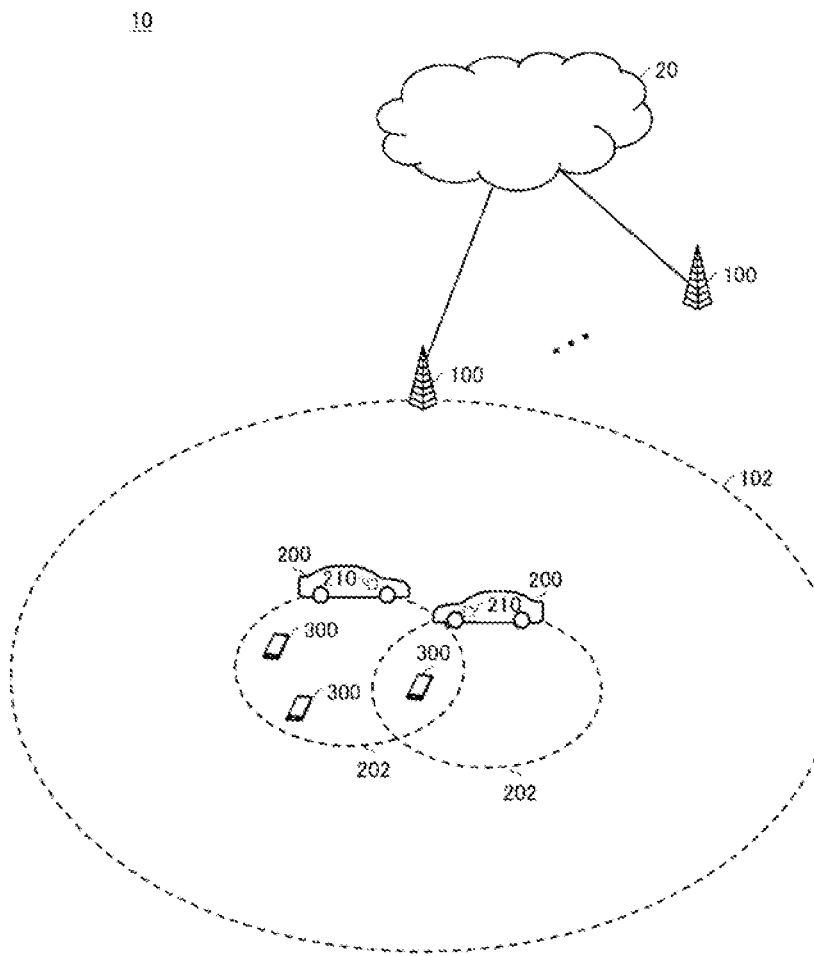
FIG. 1 schematically illustrates an exemplary communication system 10 in accordance with one aspect of the present disclosure.

FIG. 1 schematically illustrates a non-limiting example of a communication system 10. The communication system 10 includes a relay apparatus 210 for relaying communications between a wireless base station 100 and a communication terminal 300. The relay apparatus 210 may be installed in a moving body. In the present embodiment, a case in which the relay apparatus 210 is installed in a vehicle 200 will be described as an example. The vehicle 200 equipped with the relay apparatus 210 may be referred to as a moving base station. The communication system 10 may include the vehicle 200. The communication system 10 may include the wireless base station 100. Other illustrative examples of the moving body include unmanned aircrafts such as drones.

The vehicle 200 may be an automobile. The vehicle 200 may be any type of automobile as long as it has a wireless communication function. For example, the vehicle 200 may be a gasoline powered vehicle or may also be a so-called eco-friendly vehicle. Types of eco-friendly cars include HVs (hybrid vehicles), PHEVs/PHVs (plug-in hybrid vehicles), EVs (electric vehicles), and FCVs (fuel cell vehicles). The vehicle 200 may be an automobile for any application. The vehicle 200 may be, for example, a private car or a vehicle for business such as a taxi or bus.

The wireless base station 100 may conform to any mobile communication system. The wireless base station 100 conforms, for example, to a 3G (3rd Generation) communication system. The wireless base station 100 conforms, for example, to a long term evolution (LTE) communication system. The wireless base station 100 may be an eNB (eNodeB). The wireless base station 100 may conform, for example, to a 5G (5th Generation) communication system. The wireless base station 100 may be an gNB (gNodeB). The wireless base station 100 may conform to a mobile communication system following a 6G (6th Generation) communication system. Here, the case in which the wireless base station 100 conforms to the LTE communication system will be mainly described as an example.

For example, the relay apparatus 210 is within the zone of a wireless communication area 102 generated by the wireless base station 100 so as to execute wireless communication with the wireless base station 100. The fact that the relay apparatus 210 is within the zone of a wireless communication area 102 generated by the wireless base station 100 may mean that the relay apparatus 210 is located in the wireless communication area 102 so as to establish a wireless communication connection with the wireless base station 100.

For example, the relay apparatus 210 generates a wireless communication area 202, and then executes wireless communication with the communication terminal 300 which is within the zone of the wireless communication area 202. The fact that the communication terminal 300 is within the zone of the wireless communication area 202 may mean that the communication terminal 300 is located in the wireless communication area 202 so as to establish a wireless communication connection with the relay apparatus 210. Note that when the communication terminal 300 is within the zone of the wireless communication area 202 generated by the relay apparatus 210, it may be described that the communication terminal 300 is within the zone of the relay apparatus 210.

A movement communication system between the relay apparatus 210 and the communication terminal 300 may be the same as a moving body communication system between the relay apparatus 210 and the wireless base station 100. Moreover, the moving body communication system between the relay apparatus 210 and the communication terminal 300 may be different from the moving body communication system between the relay apparatus 210 and the wireless base station 100.

The communication terminal 300 may be any communication terminal as long as it has a wireless communication function. The communication terminal 300 is, for example, a mobile phone such as a smart phone, a tablet terminal, a wearable terminal, a PC (personal computer), etc. Moreover, the communication terminal 300 may be an IoT (Internet of thing) terminal.

When the vehicle 200 equipped with the relay apparatus 210 moves while the communication terminal 300 is within the zone of the relay apparatus 210, the movement of the wireless communication area 202 may result in the communication terminal 300 falling outside of the wireless communication area 202. If a handover of the communication terminal 300 is in time, the wireless communication connection of the communication terminal 300 is maintained; in contrast, if the handover is not in time, the wireless communication connection may be disconnected, likely deteriorating the user experience quality of the communication terminal 300.

The relay apparatus 210 according to the present embodiment transmits handover destination information indicating a handover destination to the communication terminal 300, which is within the zone of the relay apparatus 210, without the communication terminal 300 making and sending in advanced a measurement report on the radio waves received by communication terminal 300. The measurement report may be a so-called measurement report (also described as an MR). The case in which the communication terminal 300 carries out handover to the specified the handover destination, without making a measurement report on the received radio waves, may be described as an unmeasured handover. The case in which the communication terminal 300 receives handover destination information indicating a handover destination, without making a measurement report on the received radio waves, may be described as unmeasured handover destination information.

The relay apparatus 210 may transmit the unmeasured handover destination information to the communication terminal 300 when the likelihood that the communication terminal 300 will fall outside of the wireless communication area 202 of the relay apparatus increases. For example, when the vehicle 200 is stopped and the relay apparatus 210 is relaying communication between the wireless base station 100 and the communication terminal 300, the relay apparatus 210 transmits the unmeasured handover destination information to the communication terminal 300 upon detecting the movement of the vehicle 200. As a result, when the movement of the vehicle 200 increases the likelihood that the communication terminal 300 will fall outside of the wireless communication area 202, the communication terminal 300 can quickly carry out handover to the handover destination (indicated by the unmeasured handover destination information) without making a measurement report, making it possible to reduce events in which the handover is not in time and the wireless communication connection thereby becomes disconnected.

In an unmeasured handover, the handover destination is specified without the terminal device 300 making a measurement report on radio waves received by the terminal device 300. Therefore, it may be possible that a wireless base station in which the communication terminal 300 is not located in the wireless communication area is specified as the unmeasured handover destination. If this occurs, the communication terminal 300 may not be able to handover.

According to an exemplary embodiment, the relay apparatus 210 may transmit, to the communication terminal 300, the unmeasured handover destination information indicating the wireless base station 100 in which the relay apparatus 210 is within the zone as the handover destination. When the relay apparatus 210 is located in the wireless communication area 102, it is highly likely that the communication terminal 300 which is within the zone of the relay apparatus 210 is also located in the wireless communication area 102. Therefore, the likelihood that the handover of the communication terminal 300 can be successful is very high.

The relay apparatus 210 may measure the radio wave reception strength of other multiple relay apparatuses 210, and then transmit the unmeasured handover destination information, indicating a second relay apparatus 210 having stronger radio wave reception strength as the handover destination, to the communication terminal 300. Moreover, the relay apparatus 210 may determine temporal changes in the radio wave reception strength from other multiple relay apparatuses 210, and then transmit the unmeasured handover destination information, indicating the second relay apparatus 210 having less temporal changes in the radio wave reception strength among other multiple relay apparatuses 210 as the handover destination, to the communication terminal 300. The relay apparatus 210 may transmit the unmeasured handover destination information, indicating the second relay apparatus 210 having stronger radio wave reception strength and less temporal changes in the radio wave reception strength among other multiple relay apparatuses 210 as the handover destination, to the communication terminal 300.

When the radio wave reception strength from a second relay apparatus 210 is strong and the temporal changes in the radio wave reception strength are small, it is highly likely that this second relay apparatus 210 is located relatively close, stops, or is driving at a low speed. For example, when a first relay apparatus 210 installed in a first vehicle 200 measures the radio wave reception strength, it is highly likely that a second relay apparatus 210 (which is installed in a second vehicle 200 having strong radio wave reception strength and less temporal changes in the radio wave reception strength) is located relatively close to the first vehicle 200, stops, or is driving at a low speed. It is highly likely that the communication terminal 300 which is within the zone of a first relay apparatus 210 is located in the wireless communication area 202 of the second relay apparatus 210, wherein, even after the first relay apparatus 210 has moved, it is highly likely that it is located in the wireless communication area 202 of the second relay apparatus 210. Consequently, by transmitting the unmeasured handover destination information, indicating a second relay apparatus 210 as the handover destination, to the communication terminal 300, the likelihood that the handover of the communication terminal 300 can be successful is very high.

Figure 2:
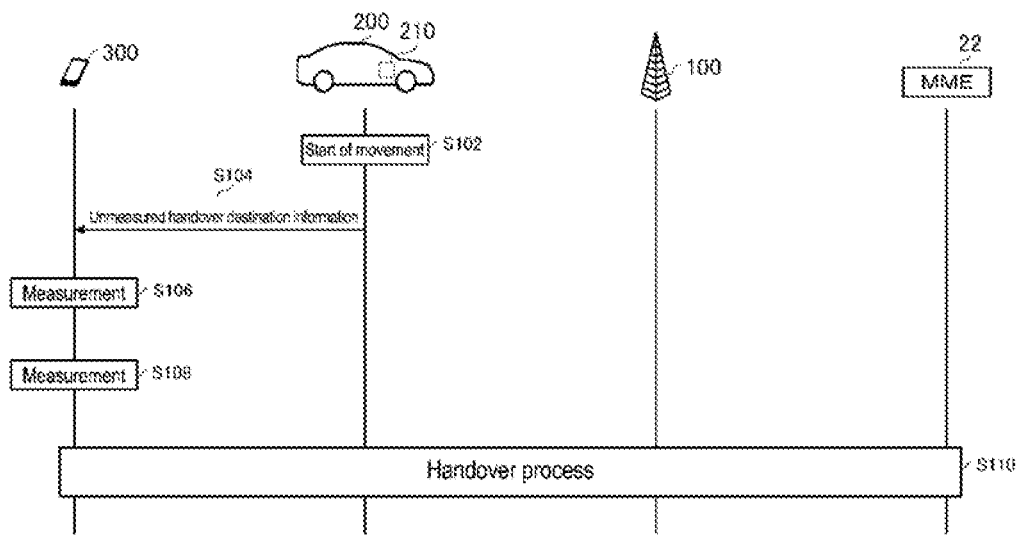
FIG. 2 schematically illustrates an exemplary process flow in the communication system 10 in accordance with one aspect of the present disclosure.

FIG. 2 schematically illustrates one example of the process flow in the communication system 10. Here, a state in which the vehicle 200 stops and the communication terminal 300 is within the zone of the relay apparatus 210 will be described as the start state.

In Step 102 (the step may be abbreviated and described as S), the vehicle 200 starts moving. In S104, in accordance with the relay apparatus 210 which has detected the start of movement of the vehicle 200, the relay apparatus 210 transmits, to the communication terminal 300, the unmeasured handover destination information indicating the wireless base station 100, in which the relay apparatus 210 is within the zone, as the handover destination.

In S106, the communication terminal 300 measures the radio wave reception strength from the relay apparatus 210. At this point, the description continues as the radio wave reception strength from the relay apparatus 210 is higher than the handover threshold.

In S108, the communication terminal 300 measures the radio wave reception strength from the relay apparatus 210. At this point, the description continues with the radio wave reception strength from the relay apparatus 210 lower than the handover threshold.

In S110, the handover process is executed, leading to the handover of the communication terminal 300. In the example illustrated in FIG. 2, the communication terminal 300 carries out handover to the wireless base station 100 in which the relay apparatus 210 is within the zone.

The handover process system may be any system. For example, the handover process may be an X2 handover. In this case, in S104, after transmitting the unmeasured handover destination information to the communication terminal 300, the relay apparatus 210 may transmit, to the handover destination, a request for the handover along with the terminal information of the communication terminal 300. This request for the handover may be a request indicating that the communication terminal 300 may carry out handover to the wireless base station 100. The wireless base station 100 stores the received request for the handover, and then waits for the request from the communication terminal 300. In S110, the communication terminal 300 transmits the request for the handover to the wireless base station 100, after which synchronous processing is carried out between the communication terminal 300 and the wireless base station 100. Moreover, a request for switching a path is transmitted from the wireless base station 100 to an MME (mobility management entity) 22 in a core network 20, wherein the MME 22 notifies the core side of the handover destination. In addition, the path is switched on the core side, completing the handover. Note that the handover process may be the S1 handover.

Figure 3:
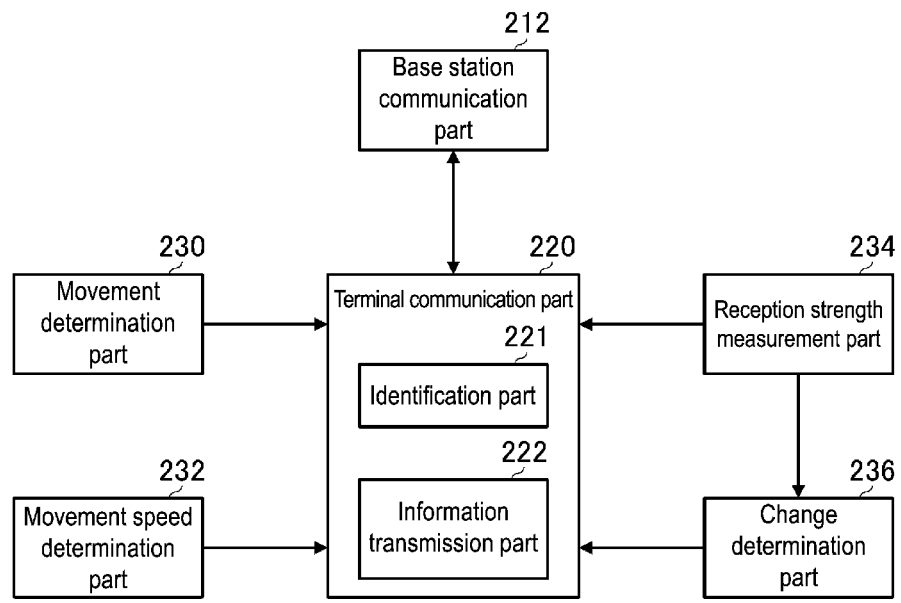
FIG. 3 schematically illustrates an exemplary functional configuration of a relay apparatus 210 in accordance with one aspect of the present disclosure.

FIG. 3 schematically illustrates one non-limiting example of the functional configuration of a relay apparatus 210. The relay apparatus 210 includes a base station communication part 212, a terminal communication part 220, a movement determination part 230, a movement speed determination part 232, a reception strength measurement part 234, and a change determination part 236. Note that it is not necessary for the relay apparatus 210 to include all of these configurations.

The base station communication part 212 wirelessly communicates with the wireless base station 100. The terminal communication part 220 wirelessly communicates with the communication terminal 300. The terminal communication part 220 has an identification part 221 and an information transmission part 222.

The identification part 221 identifies the handover destination in which the communication terminal 300 (which is within the zone of the relay apparatus 210) carries out handover from the relay apparatus 210 without making a measurement report on the received radio waves. That is, the identification part 221 identifies the unmeasured handover destination of the communication terminal 300 which is within the zone of the relay apparatus 210.

For example, the identification part 221 identifies the wireless base station 100 (in which the relay apparatus 210 is within the zone) as the handover destination. For example, the identification part 221 acquires the cell ID of the wireless base 100 (in which the relay apparatus 210 is within the zone) as information indicating the handover destination. The cell ID of the wireless base station 100 (in which the relay apparatus 210 is within the zone) may be managed by the base station communication part 212, wherein the identification part 221 may acquire the cell ID from the base station communication part 212. When the relay apparatus 210 is within a zone of a second wireless base station 100 different from the wireless base station 100 which has been within the zone, the identification part 221 may re-identify the second wireless base station 100 (which is newly within the zone) as the updated handover destination of the communication terminal 300.

The information transmission part 222 transmits the unmeasured handover destination information to the communication terminal 300 which is within the zone of the relay apparatus 210. For example, the information transmission part 222 transmits, to the communication terminal 300, the unmeasured handover destination information, indicating the handover destination identified by the identification part 221, as the handover destination. For example, the information transmission part 222 transmits a message (for example, RRC connection reconfiguration), including the specification of the handover destination as the unmeasured handover destination information, to the communication terminal 300.

The relay apparatus 210 need not have the identification part 221; alternatively, the wireless base station 100 may have the identification part. The identification part possessed by the wireless base station 100 may identify the handover destination of the communication terminal 300 which is within the zone of the relay apparatus 210 (which is within the zone of the wireless base station 100). For example, this identification part identifies the wireless base station 100 (having this identification part) as the handover destination of the communication terminal 300 which is within the zone of the relay apparatus 210. Note that another apparatus in a core network 20, not the wireless base station 100, may have the identification part.

The movement determination part 230 determines whether or not the relay apparatus 210 is moving. If the movement determination part 230 detects that a moving body equipped with the relay apparatus 210 is moving, it may determine that the relay apparatus 210 is moving; in contrast, if the movement determination part 230 detects that a moving body equipped with the relay apparatus 210 is not moving, it may determine that the relay apparatus 210 is not moving.

The information transmission part 222 may transmit the unmeasured handover destination information to the communication terminal 300 when the communication terminal 300 is within the zone of the relay apparatus 210 and the movement determination part 230 determines that the relay apparatus 210 is moving.

The movement speed determination part 232 determines whether or not a movement speed of the relay apparatus 210 is faster than a predetermined speed. If the movement speed of the moving body equipped with the relay apparatus 210 is faster than the predetermined speed, the movement speed determination part 232 may determine that the movement speed of the relay apparatus 210 is faster than the predetermined speed. If the movement speed of the moving body equipped with the relay apparatus 210 is slower than the predetermined speed, the movement speed determination part 232 may determine that the movement speed of the relay apparatus 210 is slower than the predetermined speed.

The information transmission part 222 may transmit the unmeasured handover destination information to the communication terminal 300 when the communication terminal 300 is within the zone of the relay apparatus 210 and the movement speed determination part 232 determines that the movement speed of the relay apparatus 210 is, for example, faster than the predetermined speed.

The reception strength measurement part 234 measures the radio wave reception strength from other multiple relay apparatuses 210. The identification part 221 may identify a second relay apparatus 210 (having stronger radio wave reception strength among multiple relay apparatuses 210) as the handover destination. For example, the identification part 221 identifies the second relay apparatus 210 having the strongest radio wave reception strength among multiple relay apparatuses 210 as the handover destination. The information transmission part 222 may transmit the unmeasured handover destination information indicating the second relay apparatus 210 having stronger radio wave reception strength among multiple relay apparatuses 210 as the handover destination to the communication terminal 300. For example, the information transmission part 222 transmits the unmeasured handover destination information indicating the second relay apparatus 210 having the strongest radio wave reception strength among multiple relay apparatuses 210 as the handover destination to the communication terminal 300. For example, the relay apparatus 210 transmits a message (for example, RRC connection reconfiguration) including identification information for identifying the second relay apparatus 210 having a stronger radio wave reception strength as the handover destination to the communication terminal 300. The identification information of the second relay apparatus 210 may be any information which may be able to identify the second relay apparatus 210 as the handover destination.

The change determination part 236 determines the temporal changes in the radio wave reception strength from the other multiple relay apparatuses 210. The change determination part 236 may identify a second relay apparatus 210 having less or smaller temporal changes in the radio wave reception strength among the other multiple relay apparatuses 210.

The identification part 221 may identify the second relay apparatus 210 having less or smaller temporal changes in the radio wave reception strength among multiple relay apparatuses 210 as the handover destination. For example, the identification part 221 may identify the second relay apparatus 210 having the smallest temporal changes in the radio wave reception strength as the handover destination. For example, the information transmission part 222 transmits the unmeasured handover destination information indicating the second relay apparatus 210 having the smaller temporal change in the radio wave reception strength among multiple relay apparatuses 210 as the handover destination to the communication terminal 300. For example, the information transmission part 222 transmits the unmeasured handover destination information indicating the second relay apparatus 210 having the smallest temporal change in the radio wave reception strength as the handover destination to the communication terminal 300. For example, the identification part 221 identifies the second relay apparatus 210 having a stronger radio wave reception strength and a smaller temporal change in the radio wave reception strength as the handover destination. For example, the information transmission part 222 transmits the unmeasured handover destination information indicating the second relay apparatus 210 having a stronger radio wave reception strength and a smaller temporal change in the radio wave reception strength as the handover destination to the communication terminal 300.

Figure 4:
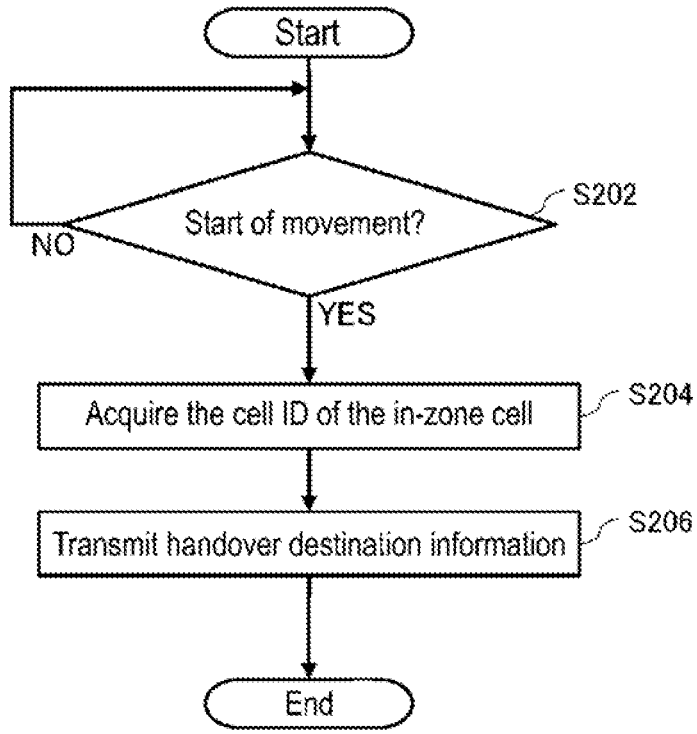
FIG. 4 schematically illustrates an exemplary process flow according to the relay apparatus 210 in accordance with one aspect of the present disclosure.

FIG. 4 schematically illustrates one example of the process flow according to the relay apparatus 210. Here, the state in which the communication terminal 300 is within the zone of the relay apparatus 210 and the relay apparatus 210 is stopped is regarded as the start state, and the process flow from the start state until the relay apparatus 210 transmits the unmeasured handover destination information to the communication terminal 300 will be schematically described.

In S202, the movement determination part 230 determines whether or not the relay apparatus 210 has started moving. If it is determined that it has started, the process proceeds to S204.

In S204, the information transmission part 222 acquires the cell ID of the wireless base station 100 in which the relay apparatus 210 is within the zone. For example, the information transmission part 222 determines that the relay apparatus 210 has started moving in S202, and then acquires the cell ID (identified by the identification part 221) from the identification part 221. Before determining that the relay apparatus 210 has started moving in S202, the information transmission part 222 may acquire the cell ID (identified by the identification part 221) from the identification part 221. The information transmission part 222 may acquire the cell ID (identified by the identification part possessed by the wireless base station 100) from this identification part.

In S206, the information transmission part 222 transmits, to the communication terminal 300, the unmeasured handover destination information (including the cell ID acquired in S204, as the handover destination). The process is then finished.

Although FIG. 4 describes an example in S202 in which the movement determination part 230 determines whether or not the relay apparatus 210 has started moving, the movement speed determination part 232 may alternatively determine whether or not the movement speed of the relay apparatus 210 is faster than a predetermined speed.

Figure 5:
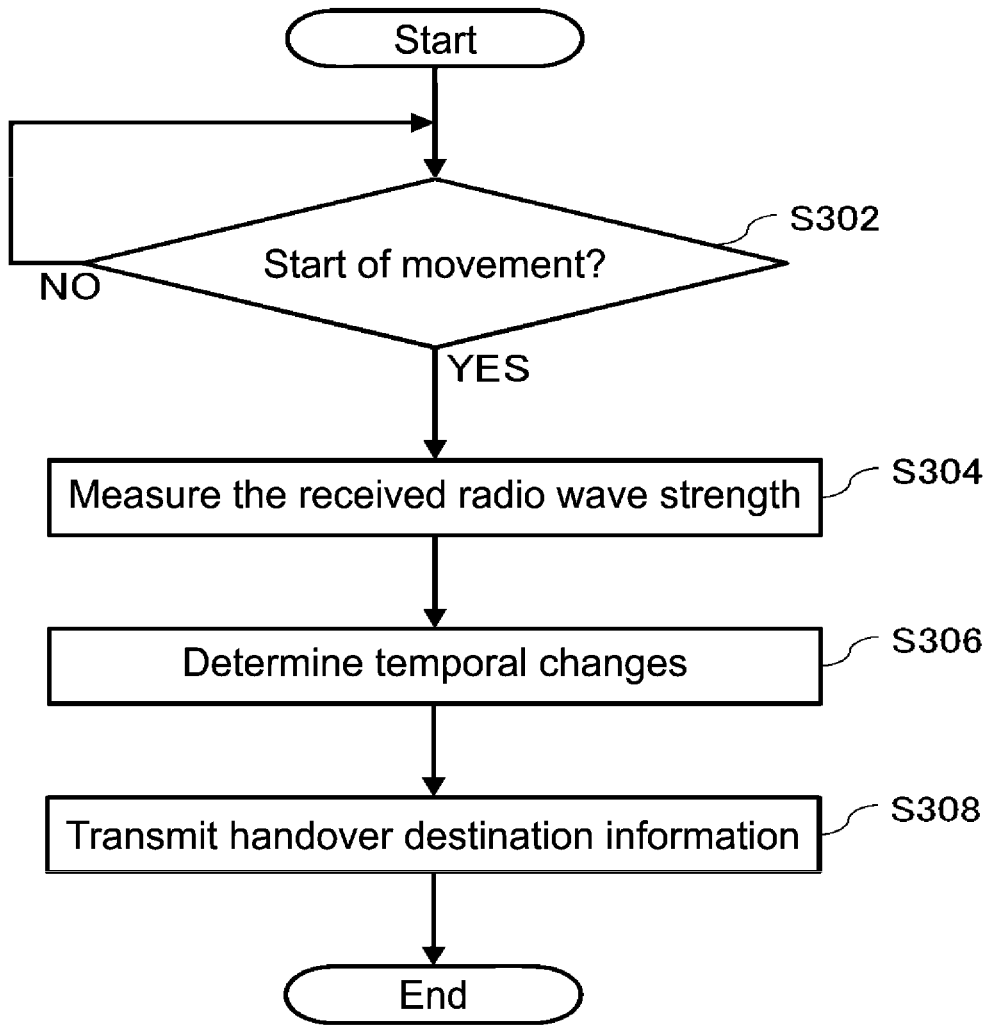
FIG. 5 schematically illustrates an exemplary process flow according to the relay apparatus 210 in accordance with one aspect of the present disclosure.

FIG. 5 schematically illustrates one example of the process flow according to the relay apparatus 210. Here, the points different from FIG. 4 will mainly be described.

In S302, the movement determination part 230 determines whether or not the relay apparatus 210 has started moving. If it is determined that it has started, the process proceeds to S304.

In S304, the reception strength measurement part 234 measures the radio wave reception strength from other multiple relay apparatuses 210. In S306, the change determination part 236 determines the temporal changes in the radio wave reception strength from the other multiple relay apparatuses 210.

In S308, the information transmission part 222 identifies a second relay apparatus 210 having the smallest temporal change in the radio wave reception strength among the relay apparatuses 210 whose radio wave reception strength is stronger than a specific strength, and then transmits the unmeasured handover destination information indicating the identified second relay apparatus 210 as the handover destination to the communication terminal 300. Note that the information transmission part 222 may identify a predetermined number of relay apparatuses 210 in the order of increasing radio wave reception strength, and from among the predetermined number identify the second relay apparatus 210 having the smallest temporal change in the radio wave reception strength, and transmit the unmeasured handover destination information indicating this second relay apparatus 210 as the handover destination to the communication terminal 300. The process is then finished.

Figure 6:
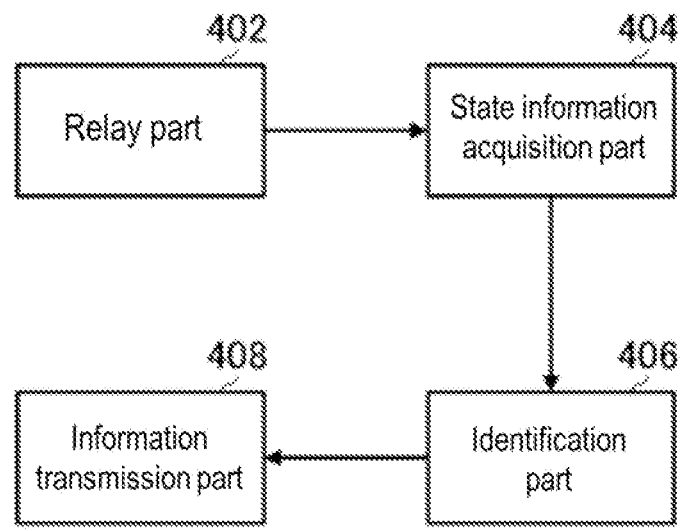
FIG. 6 schematically illustrates an exemplary functional configuration of the communication system 10 in accordance with one aspect of the present disclosure.

FIG. 6 schematically illustrates one example of the functional configuration of the communication system 10. The communication system 10 includes a relay part 402, a state information acquisition part 404, an identification part 406, and an information transmission part 408.

The relay part 402 relays the communication between the wireless base station 100 and the communication terminal 300. For example, the relay part 402 establishes a wireless communication connection with the wireless base station 100, establishes a wireless communication connection with the communication terminal 300, and relays communications between the wireless base station 100 and the communication terminal 300. The relay part 402 is movable. The relay part 402 may be installed in the moving body. The relay part 402 is disposed, for example, in the relay apparatus 210.

The state information acquisition part 404 acquires state information indicating the state of the relay part 402. The state information acquisition part 404 is disposed, for example, in the relay apparatus 210 so as to acquire the state information of the relay part 402. Moreover, for example, the state information acquisition part 404 may be disposed in the wireless base station 100 so as to receive the state information of the relay part 402 in the relay apparatus 210 (in which the wireless base station 100 is within the zone) from this relay apparatus 210.

An identification part 406 identifies the handover destination (from communication with the relay part 402) of the communication terminal 300, which carries out handover without making a measurement report on the received radio waves. That is, the identification part 406 identifies the unmeasured handover destination of the communication terminal 300 in which the relay part 402 relays the communication. For example, the identification part 406 identifies the wireless base station 100 (in which the relay part 402 is within the zone) as the unmeasured handover destination of the communication terminal 300. The identification part 406 is disposed, for example, in the relay apparatus 210. The identification part 406 is disposed, for example, in the wireless base station 100.

An information transmission part 408 notifies the communication terminal 300, which has established a wireless communication connection with the relay part 402, of the handover destination information indicating the handover destination identified by the identification part 406. The information transmission part 408 may transmit the unmeasured handover destination information indicating the unmeasured handover destination identified by the identification part 406 to the communication terminal 300 that has established a wireless communication connection with the relay part 402. The information transmission part 408 is disposed, for example, in the relay apparatus 210.

The identification part 406 may identify the handover destination of the communication terminal 300 that has established a wireless communication connection with the relay part 402 when the relay part 402 is in a first state. The information transmission part 408 may notify the communication terminal 300 of the handover destination information (indicating the handover destination identified by the identification part 406) when the relay part 402 is in a second state. The first state may be that in which the relay function of the relay part 402 has been turned on, while the second state may be that in which the relay part 402 is moving. That is, when the relay function of the relay part 402 has been turned on, the identification part 406 identifies the handover destination of the communication terminal 300 that has established a wireless communication connection with the relay part 402. When the relay part 402 is moving, the information transmission part 408 transmits the handover destination information (indicating the handover destination identified by the identification part 406) to the communication terminal 300. As a result, as the relay function has been turned on with the relay part 402 stopped, the identification part 406 identifies the handover destination. When the relay part 402 starts moving, the likelihood that the communication terminal 300 which has been within the zone of the relay part 402 will fall outside of the wireless communication area of the relay part 402 increases. Therefore, the information transmission part 408 can transmit the handover destination information to the communication terminal 300 while it is still within the zone of the relay part 402.

The identification part 406 may update and identify the handover destination of the communication terminal 300 when the relay part 402 is in the first state, and the information transmission part 408 may notify the communication terminal 300 of the handover destination information (indicating the handover destination updated and identified by the identification part 406) when the relay part 402 is in the second state. The first state may be that in which the current position of the relay part 402 is in a predetermined area, while the second state may be that in which the relay part 402 has moved beyond a predetermined speed. The predetermined area may be an area outside the wireless communication area in which the relay part 402 was previously located. That is, if the current position of the relay part 402 is outside the wireless communication area which the relay part 402 was previously located, the identification part 406 updates and identifies the handover destination. For example, when the relay part 402 is located in the wireless communication area of a first wireless base station 100, the identification part 406 identifies the first wireless base station 100 as the handover destination. When the relay part 402 moves to the wireless communication area of a second wireless base station 100, the identification part 406 updates the handover destination, and then identifies the second wireless base station 100 as the handover destination. Then, if the relay part 402 moves beyond a predetermined speed, the information transmission part 408 transmits the handover destination information (indicating the handover destination updated and identified by the relay part 402) to the communication terminal 300 (which is within the zone of the relay part 402). As a result, for example, when the relay part 402 located in the wireless communication area of the second wireless base station 100 starts moving beyond the predetermined speed, and the likelihood that the communication terminal 300 (which is within the zone of the relay part 402) will fall outside of the wireless communication area of the relay part 402 increases, the information transmission part 408 can transmit the handover destination information indicating the second wireless base station 100 as the handover destination to the communication terminal 300 (which is within the zone of the relay part 402). Note that the predetermined speed at this time may be set to 0 (zero) kilometers per hour, or may be set to a faster speed.

Figure 7:
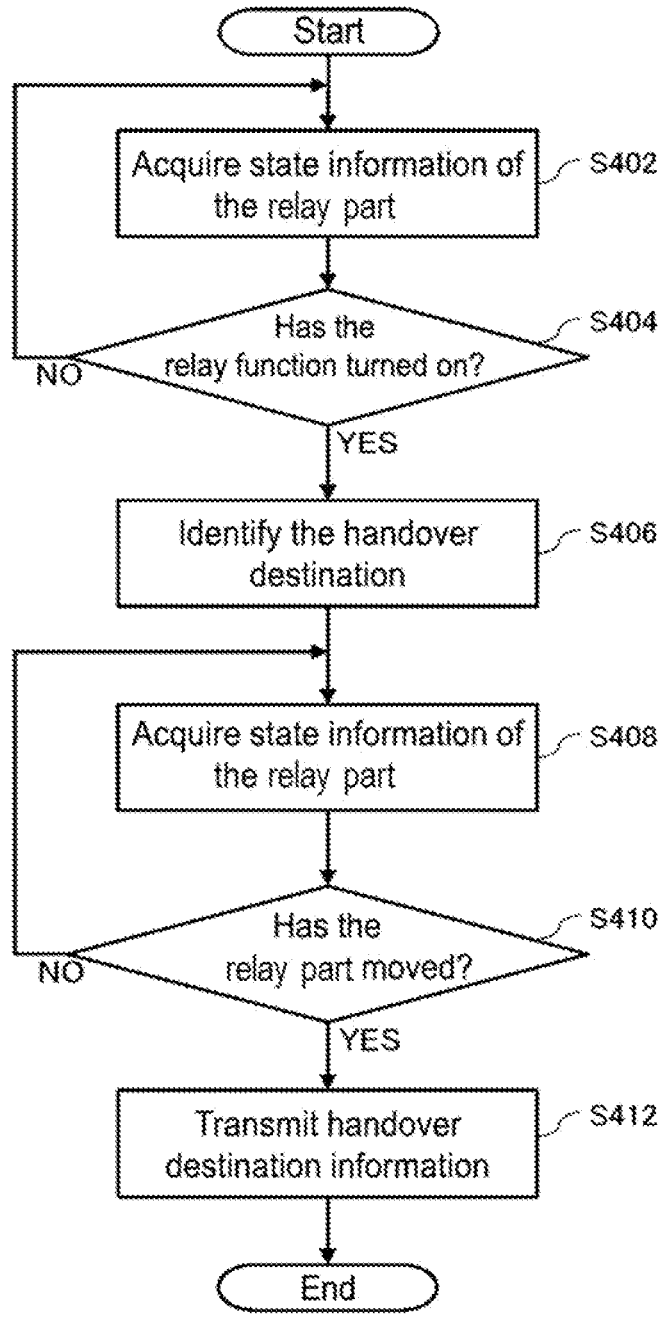
FIG. 7 schematically illustrates an exemplary process flow according to the communication system 10 in accordance with one aspect of the present disclosure.

FIG. 7 schematically illustrates one example of the process flow according to the communication system 10. Here, the process ranging from the state of monitoring the state of the relay part 402 in which the relay function has been turned off, to the transmission of the handover destination information indicating the handover destination from the relay part 402 of the communication terminal 300 to the communication terminal 300 (which is within the zone of the relay part 402) will be described.

In S402, the state information acquisition part 404 acquires the state information of the relay part 402. In S404, the state information acquisition part 404 determines whether or not the relay function of the relay part 402 has been turned on. If it is determined that it has been turned on, the process proceeds to S406. If it is determined that it has not been turned on, the process returns to S402.

In S406, the identification part 406 identifies the handover destination (from the relay part 402) of the communication terminal 300 which is within the zone of the relay part 402. For example, the identification part 406 identifies (updates) the wireless base station 100 (in which the relay part 402 is within the zone) as the handover destination.

In S408, the state information acquisition part 404 acquires the state information of the relay part 402. In S410, the state information acquisition part 404 determines whether or not the relay part 402 is moving. If it is determined that it is moving, the process proceeds to S412. If it is determined that it is not moving, the process returns to S408.

In S412, an information communication part 408 transmits the handover destination information (indicating the handover destination identified by the identification part 406 in S406) to the communication terminal 300 which is within the zone of the relay part 402. The process is then finished.

Figure 8:
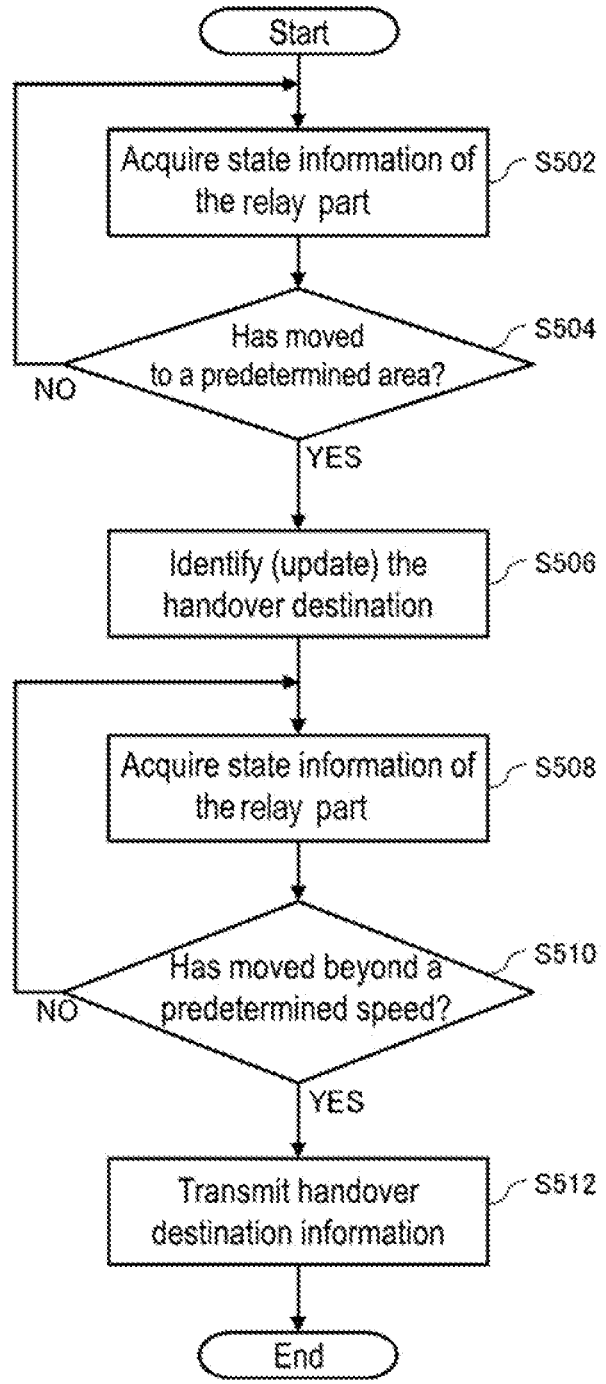
FIG. 8 schematically illustrates an exemplary process flow according to the communication system 10 in accordance with one aspect of the present disclosure.

FIG. 8 schematically illustrates one example of the process flow according to the communication system 10. Here, the process from the state of monitoring the state of the relay part 402 until the transmission of the handover destination information to the communication terminal 300 by the information transmission part 408 (when the relay part 402 is within the zone of the wireless communication area of a first wireless base station 100 and after this first wireless base station is identified as the unmeasured handover destination by identification part 406) will be described.

In S502, the state information acquisition part 404 acquires the state information of the relay part 402. In S504, the state information acquisition part 404 determines whether or not the relay part 402 has moved to an area outside the wireless communication area of a first wireless base station 100 in which the relay part 402 was located. If it is determined that it has moved, the process proceeds to S506. If it is determined that it has not moved, the process returns to S502. Here, the description continues as the relay part 402 has moved into the wireless communication area of a second wireless base station 100.

In S506, the identification part 406 identifies the handover destination (from the relay part 402) of the communication terminal 300 which is within the zone of the relay part 402. For example, the identification part 406 identifies (updates) the second wireless base station 100 in which the relay part 402 is located within the zone as the handover destination.

In S508, the state information acquisition part 404 acquires the state information of the relay part 402. In S510, the state information acquisition part 404 determines whether or not the relay part 402 is moving beyond a predetermined speed. If it is determined that it has moved beyond a predetermined speed, the process proceeds to S512. If it is determined that has not moved beyond a predetermined speed, the process returns to S508.

In S512, the information transmission part 408 transmits the handover destination information (indicating the handover destination identified (updated) by the identification part 406 in S506) to the communication terminal 300 which is located within the zone of the relay part 402. The process is then finished.

Figure 9:
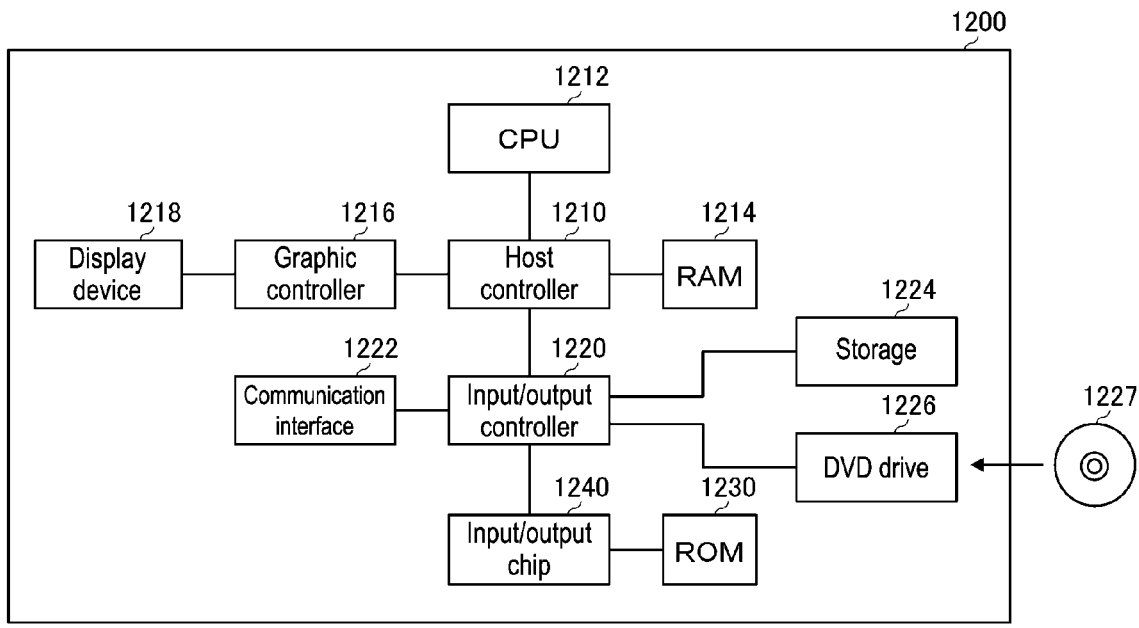
FIG. 9 schematically illustrates an exemplary hardware configuration of a computer 1200 functioning as the relay apparatus 210 in accordance with one aspect of the present disclosure.

FIG. 9 schematically illustrates one example of a hardware configuration of a computer 1200 functioning as the relay apparatus 210. A program installed in the computer 1200 can allow the computer 1200 to function as one or more "parts" of the apparatus according to the abovementioned embodiment, or allow the computer 1200 to execute an operation associated with the apparatus according to the abovementioned embodiment or the abovementioned one or more "parts," and/or allow the computer 1200 to execute a process according to the abovementioned embodiment or stages of this process. Such a program may be executed by a central processing unit (CPU) 1212 in order for the computer 1200 to execute the specific operation associated with some or all of blocks of the flowchart and block diagram described in the present specification.

The computer 1200 according to this embodiment includes the CPU 1212, a RAM 1214, and a graphic controller 1216, which are connected to each other by a host controller 1210. The computer 1200 also includes input/output units such as a communication interface 1222, a storage apparatus 1224, a DVD drive 1226, and IC card drive, wherein these are connected to a host controller 1210 via an input/output controller 1220. The DVD drive 1226 may be a DVD-ROM drive, a DVD-RAM drive, etc. The storage apparatus 1224 may be a hard disk drive, a solid state drive, etc. The computer 1200 also includes the input/output unit of a legacy such as a ROM 1230 and a touch panel, with these connected to the input/output controller 1220 via an input/output chip 1240.

The CPU 1212 operates according to the programs stored in the ROM 1230 and the RAM 1214, thereby controlling each part. The graphic controller 1216 acquires image data (generated by the CPU 1212) in a frame buffer, etc. (provided in the RAM 1214) or in itself, such that the image data is displayed on a display device 1218. The computer 1200 need not include the display device 1218, in which case the graphic controller 1216 causes the image data to be displayed on an external display device.

The communication interface 1222 communicates with other electronic devices via a wireless communication network. The storage apparatus 1224 stores a program and data used by the CPU 1212 in the computer 1200. The DVD drive 1226 reads a program or data from a DVD-ROM 1227, etc. and provides it to the storage apparatus 1224. The IC card drive reads a program and data from an IC card and/or writes the program and data in the IC card.

The ROM 1230 stores therein, a boot program, etc. (executed by the computer 1200 upon activation) and/or a program (dependent on the hardware of the computer 1200). The input/output chip 1240 may also connect various input/output units to the input/output controller 1220 via a USB port, etc.

The program is provided by a computer readable storage medium such as a DVD-ROM 1227 or an IC card. The program is read from a computer readable storage medium, installed on the storage apparatus 1224, the RAM 1214, or the ROM 1230 (which is also an example of a computer readable storage medium), and executed by the CPU 1212. The information processing described in these programs is read by the computer 1200 so as to cause a linkage between a program and the abovementioned various types of hardware resources. The apparatus or method may be configured by implementing an operation or the processing of information in accordance with the use of the computer 1200.

For example, if communication is executed between the computer 1200 and an external device, the CPU 1212 may execute a communication program loaded on the RAM 1214, and then instruct the communication interface 1222 on communication processing based on the processing described in the communication program. The communication interface 1222 reads transmission data stored in a buffer region provided in a storage medium (such as the RAM 1214, the storage apparatus 1224, the DVD-ROM 1227, or the IC card) under the control of the CPU 1212, transmits the read transmission data to a network, or writes data (received from the network) in a reception buffer region, etc. (provided on the storage medium).

Moreover, the CPU 1212 may allow all or necessary parts of files or databases (stored on external storage media such as the storage apparatus 1224, the DVD drive 1226 (DVD-ROM 1227), and the IC card) to be read by the RAM 1214, and then execute various types of processing to data on the RAM 1214. The CPU 1212 may then write back the processed data to the external recording medium.

Various types of information such as various types of programs, data, tables, and databases may be stored in a recording medium and undergo information processing. The CPU 1212 may execute various types of processing (including various types of operations, information processing, condition determination, conditional branching, unconditional branching, information retrieval/substitution, etc. which are described throughout the present disclosure and specified by the program instruction sequence) on data read from the RAM 1214, and then write back the results to the RAM 1214. Moreover, the CPU 1212 may retrieve information in a file, database, etc. in the recording medium. For example, if multiple entries, each having the attribute value of the first attribute associated with the attribute value of the second attribute, are stored in the storage medium, the CPU 1212 may retrieve an entry matching the conditions under which the attribute value of the first attribute is specified among the multiple entries, and then read the attribute value of the second attribute stored in the entry, thereby acquiring the attribute value of the second attribute associated with the first attribute satisfying predetermined conditions.

The programs or software modules described above may be stored on the computer 1200 or in a computer readable storage medium in the vicinity of the computer 1200. Moreover, a recording medium such as a hard disk or RAM provided in a server system (which is connected to a dedicated communication network or the Internet) can be used as a computer readable storage medium, thereby providing the program to the computer 1200 via a network.

The blocks in the flowcharts and block diagrams in the abovementioned disclosure may represent "parts" of the apparatus having the stage of the process for executing an operation or the role of executing the operation. The specific stages and "parts" may be implemented by a programmable circuit (which is supplied along with computer readable instructions stored on a dedicated circuit and a computer readable storage medium) and/or a processor (which is supplied along with the computer readable instruction stored on the computer readable storage medium). The dedicated circuit may include digital and/or analog hardware circuits and may also include integrated circuits (ICs) and/or discrete circuits. The programmable circuit may include, for example, reconfigurable hardware circuits including a logical product, logical sum, exclusive logical sum, negative logical product, negative logical sum, other logical operations, flip-flops, registers, and memory elements (such as a field programmable gate array (FPGA) and a programmable logic array (PLA)).

The computer readable storage medium may include any tangible device capable of storing instructions executed by an appropriate device, so that the computer readable storage medium having the instructions stored therein includes products including the instruction which may be executed in order to create a mechanism for executing operations specified in the flowchart or block diagram. Exemplary computer readable storage media may include electronic storage media, magnetic storage media, optical storage media, electromagnetic storage media, semiconductor storage media, etc. More specific examples of computer readable storage media include floppy (registered trademark) disks, diskettes, hard disks, random access memories (RAMs), read-only memories (ROM), erasable programmable read-only memories (EPROMs or flash memories), electrical erasable programmable read-only memories (EEPROMs), static random access memories (SRAMs), compact disk read-only memories (CD-ROMs), digital versatile disks (DVDs), Blue-Ray (registered trademark) disks, memory sticks, integrated circuit cards, etc.

The computer readable instructions may include either a source code or object code described in any combination of one or more programming languages which include assembler instructions, instruction set architecture (ISA) instructions, machine instructions, machine dependent instructions, microcode, firmware instructions, status setting data, or object oriented programming languages (such as Smalltalk, JAVA (registered trademark), or C++), and conventional procedural programming languages (such as "C" programming language or similar programming language).

In order for processors or programmable circuits (of general purpose computers, special purpose computers, or other programmable data processing apparatuses) to execute computer readable instructions to create a mechanism for executing operations specified in flowcharts or block diagrams, the computer readable instructions may be provided locally or via a local area network (LAN), and a wide area network (WAN) such as the Internet, to processors or programmable circuits (of general purpose computers, special purpose computers, or other programmable data processing apparatuses). Exemplary processors include computer processors, processing units, microprocessors, digital signal processors, controllers, microcontrollers, etc.

Although the present disclosure has been described with reference to the embodiments, the technical scope of the present disclosure is not limited to the scope described in the abovementioned embodiments. It will be apparent to those skilled in the art that various modifications or improvements can be made to the abovementioned embodiments. It is apparent from the description of the claims that such modified or improved embodiments may also be included in the technical scope of the disclosure.

Note that the execution order of each process of operations, procedures, steps, stages, etc. in the apparatuses, systems, programs, and methods indicated in the Claims, Specification, and drawings is not particularly explicitly stated by "prior to," "in advance," etc.; moreover, unless the output of the previous processing is used in the following process, it may be achieved in any order. Although the operation flows in the Claims, Specification, and drawings are described using "first," "next," etc. for convenience, this does not require that the operation flows be carried out in this order.

The invention claimed is:

1. A movable relay apparatus comprising:
a memory storing instructions that when executed by a processor causes the processor to:
establish a wireless communication connection with a communication terminal;
establish a wireless communication connection with a handover destination for the communication terminal; and
transmit handover destination information indicating the handover destination to the communication terminal, wherein the handover destination information is transmitted to the communication terminal without the relay apparatus receiving a measurement report from the communication terminal regarding radio waves received by the communication terminal.

2. The relay apparatus according to claim 1, wherein the memory storing instructions when executed by the processor causes the processor to: determine whether or not the relay apparatus is moving,
wherein the handover destination information is transmitted to the communication terminal when the relay apparatus establishes the wireless communication connection with the communication terminal and the relay apparatus is moving.

3. The relay apparatus according to claim 1, wherein the memory storing instructions when executed by the processor causes the processor to: determine whether or not a movement speed of the relay apparatus is faster than a predetermined speed,
wherein the handover destination information is transmitted to the communication terminal when the relay apparatus establishes the wireless communication connection with the communication terminal and the movement speed of the relay apparatus is faster than the predetermined speed.

4. The relay apparatus according to claim 1, wherein the handover destination information indicates a wireless base station with which the relay apparatus establishes a wireless communication connection as the handover destination.

5. The relay apparatus according to claim 1, wherein the memory storing instructions when executed by the processor causes the processor to: measure radio wave reception strength from other movable relay apparatuses different from the relay apparatus, and
transmit, to the communication terminal, the handover destination information indicating one of the other movable relay apparatuses having one of the stronger radio wave reception strengths from among the other movable relay apparatuses as the handover destination.

6. The relay apparatus according to claim 5, wherein the memory storing instructions when executed by the processor causes the processor to: determine temporal changes in the radio wave reception strength from the other movable relay apparatuses different from the relay apparatus, and
transmit, to the communication terminal, the handover destination information indicating one of the other movable relay apparatuses having a smaller temporal change in the radio wave reception strength from among the other movable relay apparatuses with the stronger radio wave reception strengths as the handover destination.

7. The relay apparatus according to claim 1, wherein the memory storing instructions when executed by the processor causes the processor to determine temporal changes in the radio wave reception strength from other movable relay apparatuses different from the relay apparatus, and
transmit, to the communication terminal, the handover destination information indicating one of the other movable relay apparatuses having one of the smaller temporal changes from among the other movable relay apparatuses as the handover destination.

8. The relay apparatus according to claim 1, wherein the relay apparatus is installed in a vehicle.

9. The relay apparatus according to claim 8, wherein the memory storing instructions when executed by the processor causes the processor to: transmit the handover destination information to the communication terminal when the vehicle is switched to a predetermined state.

10. The relay apparatus according to claim 8, wherein the vehicle has an OFF state, a power ON state, and a drivable state, wherein the memory storing instructions when executed by the processor causes the processor to:
relay communications between a wireless base station and the communication terminal when the vehicle is in the power ON state and the drivable state, and
transmit the handover destination information to the communication terminal when a state of the vehicle switches from the power ON state to the drivable state.

11. A communication system, comprising:
a movable relay apparatus that relays communications between a wireless base station and a communication terminal, the relay apparatus comprising a memory storing instructions that when executed by a processor causes the processor to:
identify a handover destination for the communication terminal when the relay apparatus is in a first state; and
notify the communication terminal of handover destination information indicating the handover destination when the relay apparatus is in a second state, wherein the relay apparatus notifies the communication terminal of the handover destination without receiving a measurement report from the communication terminal regarding radio waves received by the communication terminal.

12. The communication system according to claim 11, wherein:
the first state is that in which a relay function of the relay apparatus has been turned on, and
the second state is that in which the relay apparatus is moving.

13. The communication system according to claim 11, wherein:
the first state is that in which a current position of the relay apparatus is in a predetermined area, and
wherein the second state is that in which the relay apparatus moves beyond a predetermined speed.

14. A computer-implemented communication method for a movable relay apparatus, comprising:
establishing a wireless communication connection between the movable relay apparatus and a communication terminal;
identifying a handover destination for the communication terminal; and
notifying the communication terminal of handover destination information indicating the handover destination, wherein the communication terminal is notified of the handover information without the relay apparatus receiving a measurement report from the communication terminal regarding the radio wave reception strength of the handover destination.

15. The computer-implemented communication method of claim 14, further comprising establishing a wireless communication connection between the movable relay means and a wireless base station, wherein the handover destination is the wireless base station.

16. A movable relay apparatus comprising:
a memory storing instructions that when executed by a processor causes the processor to:
measure radio wave reception strength from one or more other movable relay apparatuses;
determine temporal changes in the radio wave reception strength from the other movable relay apparatuses;
specify one of the other movable relay apparatuses as a handover destination, wherein the handover destination is specified based on at least one of the measured radio wave reception strength and temporal changes in the radio wave reception strength; and transmit, to a communication terminal, handover destination information indicating the handover destination.

17. The movable relay apparatus of claim 16, wherein one of the other relay apparatuses having one of the smaller temporal changes from among the other movable relay apparatuses is specified as the handover destination.

18. The movable relay apparatus of claim 17, wherein the relay apparatus specifies the handover destination when the relay apparatus is in a first state, and the relay apparatus transmits to the communication terminal the handover destination information indicating the handover destination when the relay apparatus is in a second state.

19. A computer-implemented communication method for a movable relay apparatus, comprising:

establishing a wireless communication between the movable relay apparatus and a communication terminal;

measuring radio wave reception strength from one or more potential handover destinations for the communication terminal, wherein the one or more potential handover destinations comprises one or more other movable relay apparatuses;

specifying one of the other movable relay apparatuses as the handover destination, wherein the handover destination is specified based on the measured radio wave reception strength, wherein the handover destination is specified based on at least one of the strength of the measured radio wave reception strength and temporal changes in the radio wave reception strength; and transmitting, to the communication terminal, handover destination information indicating the handover destination.

* * * * *